United States Patent
Cheng

(10) Patent No.: US 8,095,805 B2
(45) Date of Patent: Jan. 10, 2012

(54) SECURITY FLASH MEMORY, DATA ENCRYPTION DEVICE AND METHOD FOR ACCESSING SECURITY FLASH MEMORY

(75) Inventor: Chih-Wen Cheng, Hsinchu (TW)

(73) Assignees: DDTIC Corporation Ltd., Hsinchu County (TW); Chih-Wen Cheng, Hsnchu (TW)

( * ) Notice: Subject to any disclaimer, the term of this patent is extended or adjusted under 35 U.S.C. 154(b) by 1057 days.

(21) Appl. No.: 12/000,687

(22) Filed: Dec. 17, 2007

(65) Prior Publication Data

US 2009/0055660 A1      Feb. 26, 2009

(30) Foreign Application Priority Data

Aug. 22, 2007   (TW) ............................... 96131055 A

(51) Int. Cl.
*H04L 9/06* (2006.01)

(52) U.S. Cl. ............ 713/193; 713/172; 713/186; 726/5; 726/27

(58) Field of Classification Search .................. 713/193
See application file for complete search history.

(56) References Cited

U.S. PATENT DOCUMENTS

| | | | |
|---|---|---|---|
| 6,904,493 B2 * | 6/2005 | Chiao et al. | 711/103 |
| 7,350,084 B2 * | 3/2008 | Abiko et al. | 713/193 |
| 7,478,248 B2 * | 1/2009 | Ziv et al. | 713/193 |
| 7,549,161 B2 * | 6/2009 | Poo et al. | 726/5 |
| 7,552,345 B2 * | 6/2009 | Chang et al. | 713/193 |
| 7,716,384 B2 * | 5/2010 | Kobayashi et al. | 710/10 |
| 7,882,365 B2 * | 2/2011 | Natarajan et al. | 713/193 |
| 2002/0174287 A1 * | 11/2002 | Cheng | 711/103 |
| 2007/0061581 A1 * | 3/2007 | Holtzman et al. | 713/176 |
| 2007/0061597 A1 * | 3/2007 | Holtzman et al. | 713/193 |
| 2008/0141042 A1 * | 6/2008 | Lo | 713/193 |
| 2008/0155275 A1 * | 6/2008 | Natarajan et al. | 713/193 |
| 2008/0295180 A1 * | 11/2008 | Yoneda | 726/27 |

* cited by examiner

*Primary Examiner* — Kambiz Zand
*Assistant Examiner* — Yonas Bayou
(74) *Attorney, Agent, or Firm* — Rosenberg, Klein & Lee

(57) ABSTRACT

The present invention discloses a security flash memory which includes a flash memory chip with a plurality of data transmission terminals, and a data encryption device. The data encryption device includes a verifier module with default pass code, a secret key module and a switching module. The verifier module compares a pass code with the default pass code for outputting a control signal. The secret key module is used for data encryption and data decryption. The switching module is connected to the verifier module, the data transmission terminals of the flash memory chip and the secret key module, and may connect or disconnect the data transmission terminals of the flash chip and the secret key module in response to the control signal.

15 Claims, 3 Drawing Sheets

SECURITY FLASH MEMORY, DATA ENCRYPTION DEVICE AND METHOD FOR ACCESSING SECURITY FLASH MEMORY

BACKGROUND OF THE INVENTION

1. Field of the Invention

The present invention is related to a security flash memory, data encryption device and method for accessing security memory data, and more particularly to a flash memory with an encryption device and method for accessing data via the encryption device.

2. Description of Related Art

There are many different kinds of memory cards, such as SmartMedia, CompactFlash, MMC and Secure Digital (SD). For the above memory cards, access to data stored therein is very easy as all it requires is a corresponding card reader. Thus, if such a memory card is lost or stolen, confidential data that might be stored therein can easily be accessed by an unauthorized person.

Therefore, methods for protecting contents in the memory card (CPRM, DRM, ACE, or IIS) are disclosed. In the following, the content protection (CPRM, Content Protection for Recordable Media) technology is explained. Through the CPRM technology, the user can achieve personal security of the memory card, such that the data stored in the memory card can be protected, and thus, in the case of loss of the memory card, unauthorized people will not be able to access data stored in the card.

Please refer to FIG. 1, which is a schematic view showing the conventional memory card system with CPRM function. The memory card 1 with CPRM function includes a card body 10, multiple pins 12, a flash memory 14 and a control device 16, wherein multiple pins 12 are mounted at the front end of the card body 10, and the flash memory 14 and the control device 16 are mounted inside the card body 10. The control device 16 is electrically connected with multiple pins 12 and flash memory 14, wherein the control device 16 has a register 162, which has a default value for deciding to enable or disable the CPRM function. When the CPRM function is enabled, the data stored in flash memory 14 can be accessed through the control device 16 in the CPRM manner, and otherwise the data will be accessed through the control device 16 in a general manner.

However, the CPRM technology described above for achieving memory card security still has defects because an unauthorized user of the memory card can easily access the data stored in flash memory 14 by changing the default value stored in register 162 and thus break the CPRM function.

SUMMARY OF THE INVENTION

Consequently, the present invention provides a security flash memory, an encryption device and a method for accessing memory data. The encryption device is packaged in the flash memory for providing encryption and decryption functions as accessing the data in the flash memory. Before a computer can access data in the flash memory, it has to provide the default pass code of the encryption device to the control device.

The present invention provides a control device and a data encryption device, connected to a flash memory chip and executing data encryption and decryption during data access. The data encryption device includes a verifier module, a secret key module, and a switching module. The verifier module has a default pass code and compares a pass code received from the control device with the default pass code, so as to output a control signal. The secret key module is used for encrypting and decrypting data. The switching module is connected to the verifier module, a data transmission terminal of the flash memory chip and the secret key module, and is controlled by the control signal to connect or disconnect the data transmission terminal of the flash memory chip and the secret key module.

The present invention provides a method for accessing data in flash memory, which is applied to the above described security flash memory. The method includes the steps of: judging if a pass code conforms to a default pass code in the verifier module, and connecting or deconnecting a data transmission terminal of the flash memory chip to the secret key module accordingly, thus enabling or refusing access to the data in the flash memory chip through encryption/decryption of the data.

Thus, the security flash memory of the present invention can be used to store confidential data and to effectively prevent unauthorized persons from accessing data in the flash memory.

BRIEF DESCRIPTION OF THE DRAWINGS

The foregoing aspects and many of the attendant advantages of this invention will be better understood taking reference to the following detailed description, in conjunction with the accompanying drawings, wherein.

DETAILED DESCRIPTION OF PREFERRED EMBODIMENTS

Figure 1:
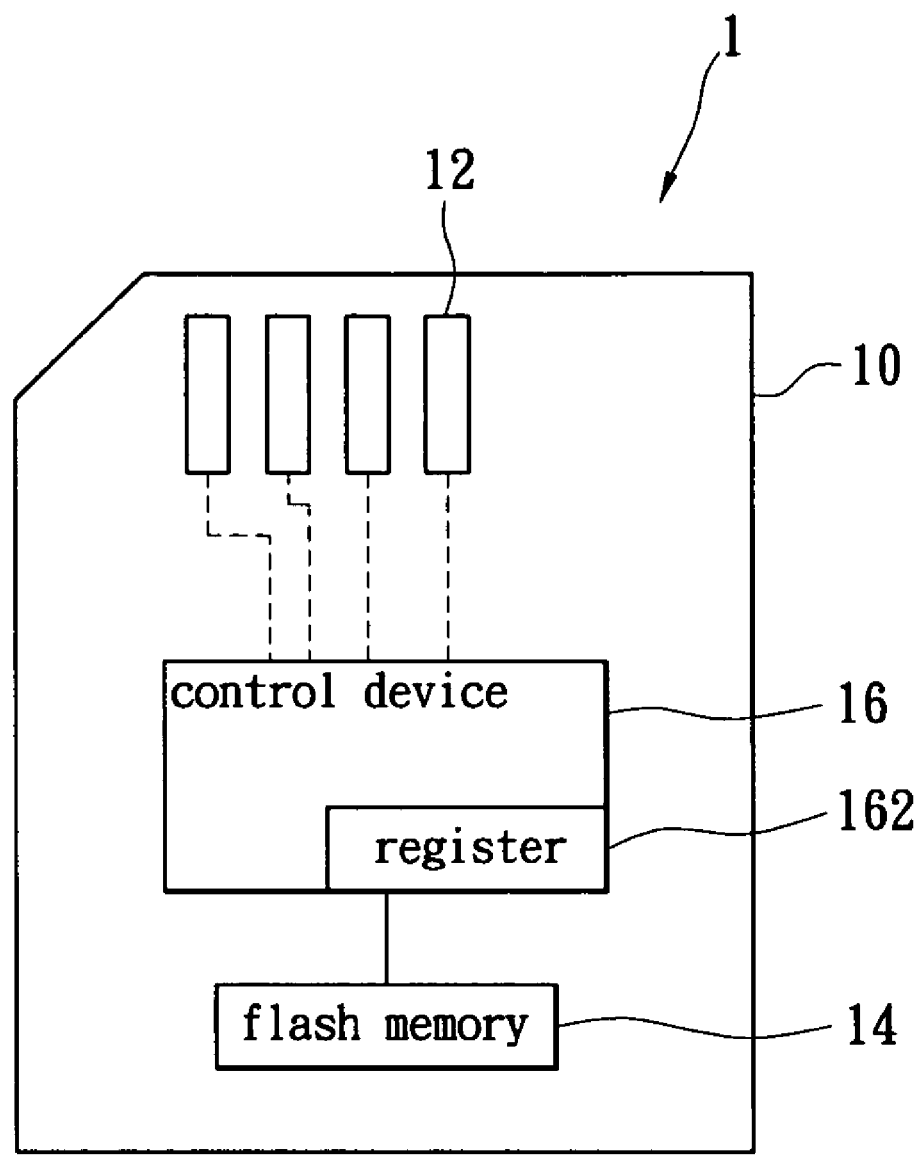
FIG. 1 is a schematic view showing a conventional memory card system with CPRM function.
Figure 2:
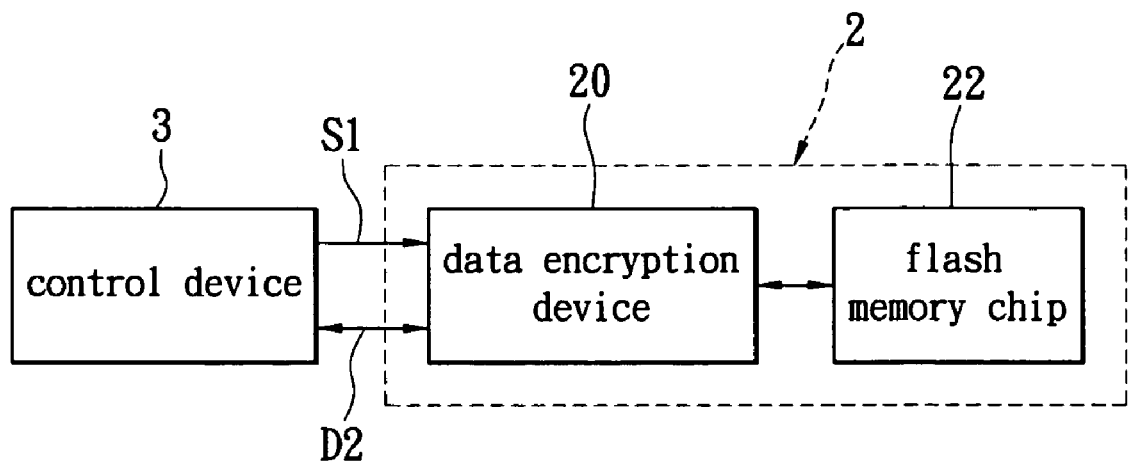
FIG. 2 is a schematic view showing a system for accessing a security flash memory according to the present invention.

Please refer to FIG. 2, which is a schematic view showing a system for accessing a security flash memory according to the present invention. The security flash memory 2 includes a data encryption device 20 electrically connected to a flash memory chip 22 with plural data transmission terminals. The data encryption device 20 and the flash memory chip 22 can be packaged to form the security flash memory 2.

Furthermore, the security flash memory 2 is electrically connected to a control device 3.

The control device 3 can decode the command from a computer (not shown) for controlling access to the security flash memory 2 according to the command.

After the control device 3 receives the computer command, a pass code S1 will be sent to flash memory 2 for obtaining an authorization from flash memory 2, so that the control device 3 can access the data stored in flash memory 2. The data should have been encrypted prior to having been written into the flash memory 2, and correspondingly, the data to be read out of the flash memory 2 is decrypted.

Figure 3:
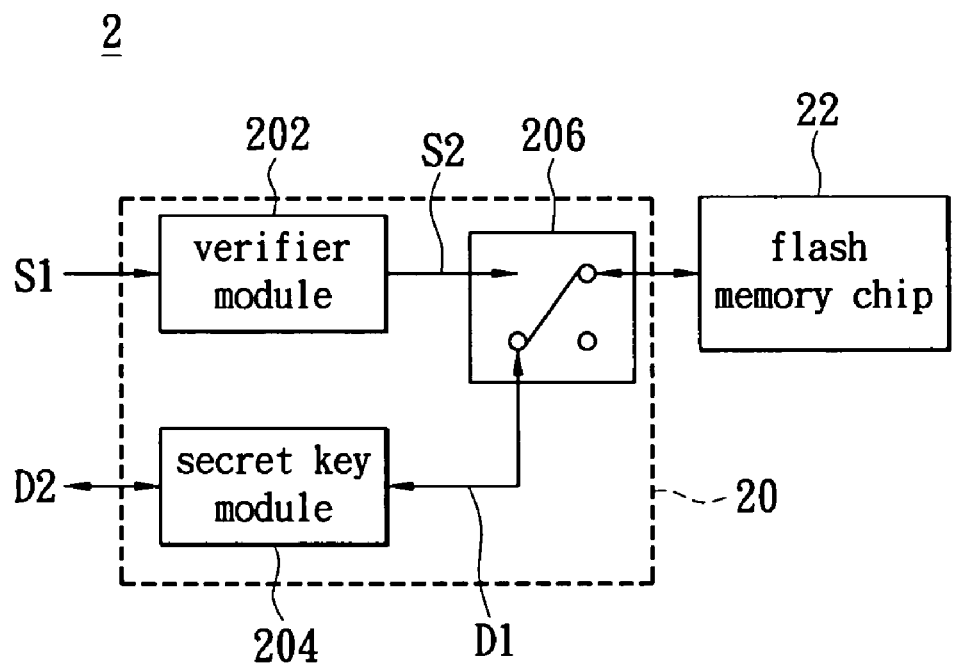
FIG. 3 is a block diagram showing the function of the security flash memory of the present invention.

Please further refer to FIG. 3, which is a block diagram showing the function of the security flash memory of the present invention. The data encryption device 20 of the security flash memory 2 includes a verifier module 202, a secret key module 204 and a switching module 206, wherein the verifier module 202 is electrically connected to the control device 3. The verifier module 202 has a default pass code, so that when the pass code S1 sent by the control device 3 is received by the verifier module 202, the pass code S1 is compared with the default pass code, so as to output a control signal S2 according to the comparison result.

Furthermore, the secret key module 204 is electrically connected with the control device 3. The secret key module 204 has an encryption/decryption transformation list, and according thereto, the data can be encrypted and decrypted. The switching module 206 is connected to the verifier module 202, the data transmission terminals of the flash memory chip 22 and the secret key module 204, and the switching module 206 is controlled by control signal S2 so as to connect or disconnect the data transmission terminals and the secret key module 204.

When the pass code sent by control device 3 conforms to the default pass code stored in the verifier module 202, the verifier module 202 sends out an enabling control signal S2 to the switching module 206 causing the switching module 206 to connect the data transmission terminals of the flash memory chip 22 with the secret key module 204. At this time, the secret key module 204 receives the encrypted data D1 from the flash memory chip 22 through the switching module 206, and then sends the decrypted data D2 to the control device 3. Besides, the control device 3 also can be a control chip with content protection (CPRM, DRM, ACE or IIS) function, so that the control chip with content protection function can access the decrypted data D2 in a content protection manner.

When the pass code S1 sent by the control device 3 does not conform to the default pass code stored in the verifier module 202, the verifier module outputs a disabling control signal S2 to switching module 206 causing switching module 206 to disconnect the data transmission terminals of the flash memory chip 22 from the secret key module 204. At this time, the control device 3 cannot obtain the authorization of the flash memory 2, so that the data stored in the flash memory 2 can not be accessed.

Figure 4:
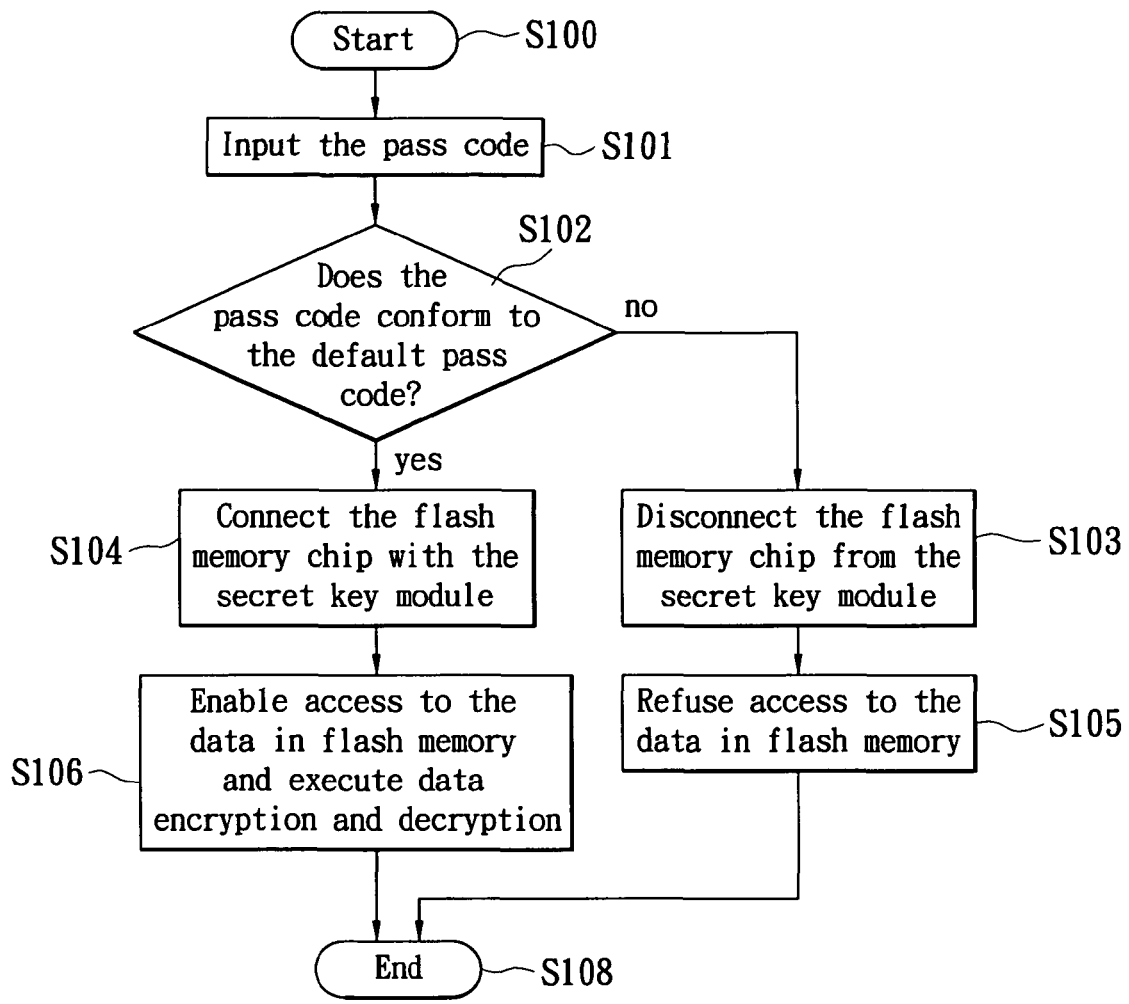
FIG. 4 is a flow chart showing the method for accessing data from memory according to the present invention.

Please further refer to FIG. 4, which is a flow chart showing the method for accessing data from memory according to the present invention.

The control device 3 decodes the command from the computer and controls access to the data in the security flash memory 2 according to the command. The accessing method includes steps of:

The control device 3 becomes active (S100). According to the command from the computer, the control device 3 sends out a pass code S1 (S101) to the verifier module 202 in the security flash memory 2, and verifier module 202 judges if pass code S1 conforms to the default pass code stored therein. If pass code S1 conforms to the default pass code, the verifier module 202 causes switching module 206 to connect the data transmission terminals of flash memory chip 22 with the secret key module 204 (S104). Thus, the security flash memory 2 allows the control device 3 to access the data in flash memory chip 22. When accessing data the secret key module 204 sends the data D2 to the control device 3 after data decryption (S106) according to an encryption/decryption transformation list. Then the control device 3 ends the actions (S108). Accordingly, when writing data to the flash memory chip 22 the secret key module 204 will encrypt the data.

If pass code S1 does not conform to the default pass code, the verifier module 202 causes switching module 206 to disconnect the data transmission terminals of flash memory chip 22 from the secret key module 204 (S103). Thus, the security flash memory refuses the control device 3 to access the flash memory chip 22, and then, the control device 3 ends the action (S108).

Before accessing data stored in the security flash memory of the present invention by means of a computer, the security flash memory of the present invention can require authorization before granting access and can provide decryption during data access, so that confidential data stored in the security flash memory is safe from unauthorized access.

It is to be understood, however, that even though numerous characteristics and advantages of the present invention have been set forth in the foregoing description together with details of the structure and function of the invention, the disclosure is illustrative only, and changes may be made in detail, especially in matters of shape, size, and arrangement of parts within the structure. The principles of the invention in their full extent and broad general meaning are expressed by the terms of the appended claims.

What is claimed is:

1. A security flash memory, comprising:
   a flash memory chip, with plural data transmission terminals; and
   a data encryption device, connected to the data transmission terminals of the flash memory chip, comprising:
   a verifier module having a default pass code, for comparing a pass code with the default pass code, wherein when the pass code matches the default pass code the verifier module sends out an enabling control signal; otherwise the verifier module sends out a disabling control signal;
   a secret key module; and
   a switching module, connected with the verifier module, the data transmission terminals of the flash memory chip and the secret key module, for receiving the enabling control signal to cause the data transmission terminals of the flash memory chip to be in connection with the secret key module, and receiving the disabling control signal to cause the data transmission terminals of the flash memory chip to be disconnecting from the secret key module;
   wherein when the flash memory chip is connected with the secret key module, the flash memory chip is accessible allowing for the secret key module to decrypt the data from the flash memory chip and encrypt the data written into the flash memory chip.

2. The security flash memory as claimed in claim 1, wherein the pass code is generated by a control device, which is connected with the verifier module and the secret key module.

3. The security flash memory as claimed in claim 2, wherein the secret key module has an encryption/decryption transformation list for encrypting and decrypting the data written thereto and read therefrom, respectively.

4. The security flash memory as claimed in claim 3, wherein the secret key module encrypts the data before the data is written into the flash memory chip, or contrarily, decrypts the data after the data is read out of the flash memory chip.

5. The security flash memory as claimed in claim 4, wherein the control device accesses the decrypted data in a content protection manner selected from a group consisting of CPRM, DRM, ACE, and IIS.

6. A data encryption device, connected to a flash memory chip, comprising:
   a verifier module having a default pass code, for comparing a pass code with the default pass code, wherein when the pass code matches the default pass code the verifier module sends out an enabling control signal; otherwise, the verifier module sends out a disabling control signal; and a switching module, connected with the verifier module, plural data transmission terminals of the flash memory chip and the secret key module, for receiving the enabling control signal to cause the data transmission terminals of the flash memory chip to be connecting with the secret key module, and receiving the disabling control signal to cause the data transmission terminals of the flash memory chip to be disconnecting from the secret key module;

wherein when the flash memory chip is connected with the secret key module, the flash memory chip is accessible allowing for the secret key module to decrypt the data from the flash memory chip and encrypt the data written into the flash memory chip.

7. The data encryption device as claimed in claim 6, wherein the pass code is generated by a control device, which is connected with the verifier module and the secret key module.

8. The data encryption device as claimed in claim 7, wherein the secret key module has an encryption/decryption transformation list for encrypting and decrypting the data written thereto and read therefrom, respectively.

9. The data encryption device as claimed in claim 8, wherein the secret key module encrypts the data before the data is written into the flash memory chip, and decrypts the data after the data is read out of the flash memory chip.

10. The data encryption device as claimed in claim 9, wherein the control device accesses the decrypted data in a content protection manner selected from a group consisting of CPRM, DRM, ACE and IIS.

11. A method for accessing a data in a flash memory having a verifier module, a flash memory chip, a secret key module and a switching module, the method comprising steps of:

receiving a pass code by the verifier module, wherein the pass code is generated by a control device connected with the verifier module and the secret key module;

determining if the pass code matches a default pass code by the verifier module;

if the pass code matches the default pass code, sending out an enabling control signal to the switching module by the verifier module for causing plural data transmission terminals of the flash memory chip to be connecting with the secret key module; and otherwise, sending out a disabling control signal to the switching module by the verifier module for causing the data transmission terminals of the flash memory chip to be disconnecting from the secret key module;

wherein when the flash memory chip is connected with the secret key module the flash memory chip accessible by the control device allowing for the secret key module to decrypt the data from the flash memory chip and encrypt the data written into the flash memory chip.

12. The method as claimed in claim 11, wherein when the flash memory chip is disconnected from the secret key module the flash memory chip by the control device is not accessible by the control device.

13. The method as claimed in claim 11, wherein the secret key module encrypts and decrypts the data written to the flash memory chip and read from the flash memory chip, respectively, according to an encryption/decryption transformation list.

14. The method as claimed in claim 13, wherein the secret key module encrypts the data before the data is written into the flash memory, and decrypts the data after the data is read out of the flash memory chip.

15. The method as claimed in claim 14, wherein, in the enabling step, the control device accesses the decrypted data in a content protection manner selected from a group consisting of CPRM, DRM, ACE and IIS or a general manner.

* * * * *